United States Patent
Vlaskamp et al.

(10) Patent No.: US 12,372,786 B2
(45) Date of Patent: Jul. 29, 2025

(54) MONOVISION DISPLAY FOR WEARABLE DEVICE

(71) Applicant: Magic Leap, Inc., Plantation, FL (US)

(72) Inventors: Bjorn Nicolaas Servatius Vlaskamp, Plantation, FL (US); Jason Allen Shultz, Miami, FL (US); William Hudson Welch, Fort Lauderdale, FL (US); Bing Wu, Davie, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/400,278

(22) Filed: Dec. 29, 2023

(65) Prior Publication Data

US 2024/0134191 A1 Apr. 25, 2024

Related U.S. Application Data

(63) Continuation of application No. 17/330,173, filed on May 25, 2021, now Pat. No. 11,971,542.
(Continued)

(51) Int. Cl.
*G02B 27/01* (2006.01)
*G02B 27/00* (2006.01)

(52) U.S. Cl.
CPC ..... *G02B 27/0101* (2013.01); *G02B 27/0093* (2013.01); *G02B 2027/0132* (2013.01); *G02B 2027/014* (2013.01)

(58) Field of Classification Search
CPC .... G02B 27/01–0189; G02B 2027/0105–0198
See application file for complete search history.

(56) References Cited

U.S. PATENT DOCUMENTS

| 10,345,600 B1 | 7/2019 | Chi et al. |
| 11,971,542 B2 | 4/2024 | Vlaskamp et al. |

(Continued)

FOREIGN PATENT DOCUMENTS

| CN | 103348682 A | 10/2013 |
| CN | 104765445 A | 7/2015 |

(Continued)

OTHER PUBLICATIONS

U.S. Appl. No. 17/330,173, "Advisory Action", Aug. 28, 2023, 4 pages.
(Continued)

*Primary Examiner* — Christopher A Lamb, II
(74) *Attorney, Agent, or Firm* — KILPATRICK TOWNSEND & STOCKTON LLP

(57) ABSTRACT

A wearable device includes a left optical stack having a left eyepiece configured to receive left virtual image light, a left accommodating lens, and a left compensating lens. The wearable device also includes a right optical stack having a right eyepiece configured to receive right virtual image light, a right accommodating lens, and a right compensating lens. An optical power of the left accommodating lens is equal in magnitude to an optical power of the left compensating lens, an optical power of the right accommodating lens is equal in magnitude to an optical power of the right compensating lens, and the optical power of the left accommodating lens and the optical power of the right accommodating lens differ by an offset amount.

19 Claims, 14 Drawing Sheets

Related U.S. Application Data

(60) Provisional application No. 63/030,249, filed on May 26, 2020.

(56) References Cited

U.S. PATENT DOCUMENTS

| | | | |
|---|---|---|---|
| 2013/0077049 A1 | 3/2013 | Bohn | |
| 2013/0286170 A1 | 10/2013 | Qin et al. | |
| 2014/0282144 A1* | 9/2014 | Maciocci | H04N 13/344 715/765 |
| 2015/0370071 A1* | 12/2015 | Alton | G02F 1/1313 359/275 |
| 2017/0315365 A1* | 11/2017 | Shen | G06T 19/006 |
| 2019/0311527 A1 | 10/2019 | Schwab et al. | |
| 2019/0324276 A1 | 10/2019 | Edwin et al. | |
| 2020/0043236 A1 | 2/2020 | Miller et al. | |
| 2020/0379214 A1* | 12/2020 | Lee | G02B 27/0179 |
| 2021/0133994 A1 | 5/2021 | Valli et al. | |
| 2021/0373327 A1 | 12/2021 | Maskamp et al. | |

FOREIGN PATENT DOCUMENTS

| | | |
|---|---|---|
| CN | 106461953 A | 2/2017 |
| DE | 102016200136 A1 | 7/2017 |
| EP | 2891953 A1 | 7/2015 |
| EP | 3001238 A1 | 3/2016 |
| JP | 2014506053 A | 3/2014 |
| JP | 2019507902 A | 3/2019 |
| WO | 2019143688 A1 | 7/2019 |
| WO | 2021242773 A1 | 2/2021 |

OTHER PUBLICATIONS

U.S. Appl. No. 17/330,173, "Final Office Action", Jun. 15, 2023, 17 pages.
U.S. Appl. No. 17/330,173, "Non-Final Office Action", Oct. 6, 2022, 16 pages.
U.S. Appl. No. 17/330,173, "Notice of Allowance", Oct. 6, 2023, 12 pages.
EP21813617.4, "Extended European Search Report", Nov. 8, 2023, 9 pages.
PCT/US2021/034084, "International Preliminary Report on Patentability", Dec. 8, 2022, 10 pages.
PCT/US2021/034084, "International Search Report and Written Opinion", Sep. 10, 2021, 11 pages.
CN202180037785.8, "Office Action and English translation", Apr. 30, 2025, 16 pages.
JP2022-572338, "Office Action and English translation", Feb. 18, 2025, 13 pages.

* cited by examiner

MONOVISION DISPLAY FOR WEARABLE DEVICE

CROSS-REFERENCES TO RELATED APPLICATIONS

This application is a continuation of U.S. patent application Ser. No. 17/330,173 filed on May 25, 2021, U.S. Pat. No. 11,971,542, issued on Apr. 30, 2024, entitled "MONOVISION DISPLAY FOR WEARABLE DEVICE," which is a non-provisional of and claims the benefit of and priority to U.S. Provisional Patent Application No. 63/030,249, filed May 26, 2020, entitled "MONOVISION DISPLAY FOR WEARABLE DEVICE," the entire contents of which are hereby incorporated by reference for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide techniques for operating fixed focal plane optical systems so as to reduce the vergence accommodation conflict (VAC) experienced by a user. Although the present invention is described in reference to an optical system such as an augmented reality (AR) device, the disclosure is applicable to a variety of applications in computer vision and image display systems.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a wearable device comprising: a left optical stack comprising: a left eyepiece configured to receive left virtual image light and output the left virtual image light toward a user side of the wearable device; a left accommodating lens disposed between the left eyepiece and the user side of the wearable device; a left compensating lens disposed between the left eyepiece and a world side of the wearable device; a right optical stack comprising: a right eyepiece configured to receive right virtual image light and output the right virtual image light toward the user side of the wearable device; a right accommodating lens disposed between the right eyepiece and the user side of the wearable device; a right compensating lens disposed between the right eyepiece and the world side of the wearable device; wherein: an optical power of the left accommodating lens is equal in magnitude to an optical power of the left compensating lens; an optical power of the right accommodating lens is equal in magnitude to an optical power of the right compensating lens; and the optical power of the left accommodating lens and the optical power of the right accommodating lens differ by an offset amount.

Example 2 is the wearable device of example(s) 1, wherein the left accommodating lens is a diverging lens and the left compensating lens is a converging lens.

Example 3 is the wearable device of example(s) 1, wherein the right accommodating lens is a diverging lens and the right compensating lens is a converging lens.

Example 4 is the wearable device of example(s) 1, wherein the offset amount is greater than a threshold.

Example 5 is the wearable device of example(s) 4, wherein the threshold is one of 0.1 D, 0.2 D, 0.3 D, 0.4 D, 0.5 D, 0.6 D, 0.7 D, 0.8 D, 0.9 D, or 1.0 D.

Example 6 is the wearable device of example(s) 1, wherein: the optical power of the left accommodating lens is −1.0 D; the optical power of the left compensating lens is +1.0 D; the optical power of the right accommodating lens is −1.65 D; the optical power of the right compensating lens is +1.65 D.

Example 7 is an optical system comprising: a left optical stack configured to output left virtual image light toward a user side of the optical system; a right optical stack configured to output right virtual image light toward the user side of the optical system, wherein each of the left optical stack and the right optical stack is configured to switch between displaying virtual content at a first focal plane or a second focal plane; and a processing module configured to perform operations comprising: determining whether or not an activation condition is satisfied; and in response to determining that the activation condition is satisfied, activating a monovision display mode associated with the optical system, wherein activating the monovision display mode includes: causing the left optical stack to display the virtual content at the first focal plane; and causing the right optical stack to display the virtual content at the second focal plane.

Example 8 is the optical system of example(s) 7, wherein an optical power associated with the first focal plane and an optical power associated with the second focal plane differ by an offset amount.

Example 9 is the optical system of example(s) 8, wherein the offset amount is greater than a threshold.

Example 10 is the optical system of example(s) 9, wherein the threshold is one of 0.1 D, 0.2 D, 0.3 D, 0.4 D, 0.5 D, 0.6 D, 0.7 D, 0.8 D, 0.9 D, or 1.0 D.

Example 11 is the optical system of example(s) 7, wherein determining whether the activation condition is satisfied includes: capturing, using one or more eye tracking cameras of the optical system, eye tracking data corresponding to one or both eyes of a user of the optical system; determining whether or not a vergence distance can be determined based on the eye tracking data; and determining that the vergence distance cannot be determined based on the eye tracking data.

Example 12 is the optical system of example(s) 7, wherein determining whether the activation condition is satisfied includes: determining that eye tracking data is unavailable.

Example 13 is the optical system of example(s) 7, wherein determining whether the activation condition is satisfied includes: determining whether or not the virtual content to be displayed is represented at both the first focal plane and the second focal plane; and determining that the virtual content to be displayed is represented at both the first focal plane and the second focal plane.

Example 14 is the optical system of example(s) 7, wherein the operations further comprise: in response to determining that the activation condition is no longer satisfied, deactivating a monovision display mode, wherein deactivating the monovision display mode includes: causing the left optical stack and the right optical stack to display the virtual content at the first focal plane; or causing the left optical stack and the right optical stack to display the virtual content at the second focal plane.

Example 15 is the optical system of example(s) 7, wherein the operations further comprise: after a predetermined amount of time, modifying the monovision display mode thereby causing: causing the left optical stack to switch from displaying the virtual content at the first focal plane to displaying the virtual content at the second focal plane; and causing the right optical stack to switch from displaying the virtual content at the second focal plane to displaying the virtual content at the first focal plane.

Example 16 is a method comprising: providing a wearable device including a left optical stack and a right optical stack, wherein each of the left optical stack and the right optical stack is configured to switch between displaying virtual content at a first focal plane or a second focal plane; receiving the virtual content to be displayed at the left optical stack and the right optical stack; determining whether or not an activation condition is satisfied; and in response to determining that the activation condition is satisfied, activating a monovision display mode associated with the wearable device, wherein activating the monovision display mode includes: causing the left optical stack to display the virtual content at the first focal plane; and causing the right optical stack to display the virtual content at the second focal plane.

Example 17 is the method of example(s) 16, wherein an optical power associated with the first focal plane and an optical power associated with the second focal plane differ by an offset amount.

Example 18 is the method of example(s) 17, wherein the offset amount is greater than a threshold.

Example 19 is the method of example(s) 18, wherein the threshold is one of 0.1 D, 0.2 D, 0.3 D, 0.4 D, 0.5 D, 0.6 D, 0.7 D, 0.8 D, 0.9 D, or 1.0 D.

Example 20 is the method of example(s) 16, wherein determining whether the activation condition is satisfied includes: capturing, using one or more eye tracking cameras of the wearable device, eye tracking data corresponding to one or both eyes of a user of the wearable device; determining whether or not a vergence distance can be determined based on the eye tracking data; and determining that the vergence distance cannot be determined based on the eye tracking data.

Example 21 is the method of example(s) 16, wherein determining whether the activation condition is satisfied includes: determining that eye tracking data is unavailable.

Example 22 is the method of example(s) 16, wherein determining whether the activation condition is satisfied includes: determining whether or not the virtual content to be displayed is represented at both the first focal plane and the second focal plane; and determining that the virtual content to be displayed is represented at both the first focal plane and the second focal plane.

Example 23 is the method of example(s) 16, further comprising: in response to determining that the activation condition is no longer satisfied, deactivating a monovision display mode, wherein deactivating the monovision display mode includes: causing the left optical stack and the right optical stack to display the virtual content at the first focal plane; or causing the left optical stack and the right optical stack to display the virtual content at the second focal plane.

Example 24 is the method of example(s) 16, further comprising: after a predetermined amount of time, modifying the monovision display mode thereby causing: causing the left optical stack to switch from displaying the virtual content at the first focal plane to displaying the virtual content at the second focal plane; and causing the right optical stack to switch from displaying the virtual content at the second focal plane to displaying the virtual content at the first focal plane.

Example 25 is a wearable system configured to perform any of the methods of example(s)s 16 to 24.

Example 26 is a non-transitory computer-readable medium comprising instructions that, when executed by one or more processors, cause the one or more processors to perform any of the methods of example(s)s 16 to 24.

Numerous benefits are achieved by way of the present disclosure over conventional techniques. For example, embodiments described herein reduce VAC within a defined operating range for near eye AR/VR headset devices by extending the depth of field through monovision. This allows each eye of a user to receive a different optical power for virtual content while the real world remains unaltered. This drives the user to accommodate to whichever eye has a sharper image, inherently decreasing the VAC and increasing the perceived sharpness of the virtual and/or real-world images.

DETAILED DESCRIPTION OF SPECIFIC EMBODIMENTS

Augmented reality (AR) wearable displays can utilize focal planes to present virtual content to a user. Many of these displays cause users to suffer from visual discomfort due to vergence accommodation conflict (VAC) that is experienced differently at different depths. During natural vision in the real world, the inward rotation of a user's eyes (convergence) and focus control or accommodation are neutrally coupled. When a user experiences VAC, the user's brain receives mismatching cues between the distance of a virtual object and the focusing distance required for the eyes to focus on that object. VAC leads to visual fatigue, headache, nausea, and eyestrain, and remains a significant source of discomfort for users. Accordingly, to maintain user comfort, modern AR and mixed reality (MR) wearable displays may consider a VAC budget allowance when delivering virtual content over a depth range, which may result in a depth range that is significantly reduced.

Various approaches to mitigate VAC have been implemented. One approach includes adding a second focal plane and a vari-focal switch based on eye tracking to the display system. Many of these systems may not render information at different depths simultaneously and, thus, the entire scene is rendered using one of the two focal planes. The focal plane on which the entire scene is rendered may be selected based on gaze information computed using eye tracking cameras. Another approach is to add a vari-focal element with the ability to sweep eyepiece focal planes across a broad range. This approach may come with increased volume in the form of additional eyepiece layers and/or through integration of liquid-fillable tunable lens pairs straddling the eyepiece, as well as increased complexity due to complex illumination schemes.

Embodiments described herein include wearable systems and devices that incorporate monovision display techniques, in which each eye of a user perceives virtual content having a different optical power. These systems and devices overcome many of the problems associated with conventional wearable devices that display an entire scene at a single focal plane for both optical stacks, which are generally associated with significant VAC. In some embodiments, a wearable device may activate and deactivate a monovision display mode based on whether an activation condition is satisfied. The activation condition may correspond to the availability of eye tracking information, the depth of the virtual content to be displayed, a user preference, among other possibilities.

Figure 1:
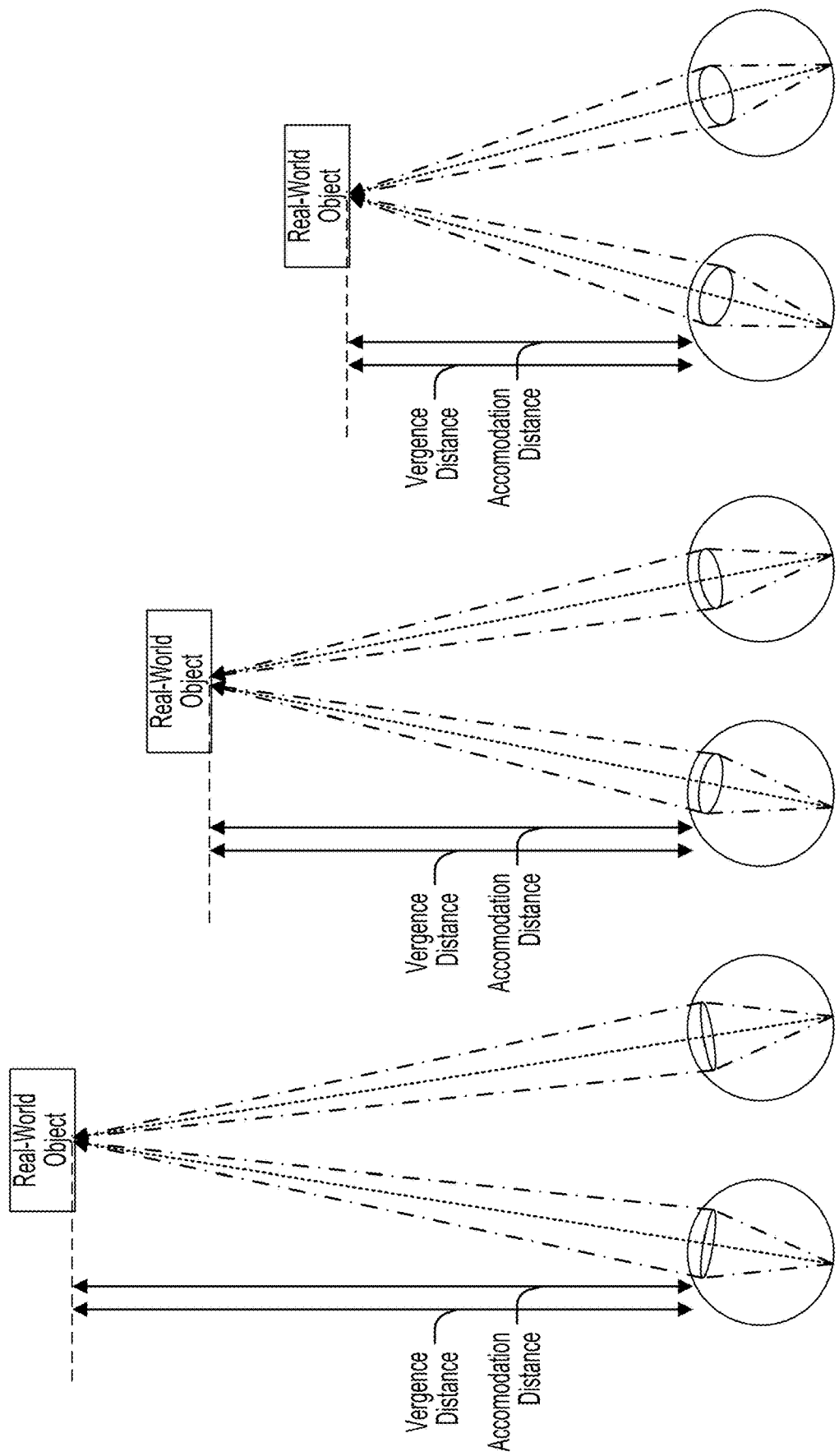
FIGS. 1A-1C illustrate examples of the vergence and accommodation of a user's eyes during natural vision.

FIGS. 1A-1C illustrate examples of the vergence and accommodation of a user's eyes during natural vision. As used herein, vergence refers to the rotation of the eyes to fixate an object and maintain a single fused image, and accommodation refers to the adjustment of the eye's lens power to maintain a sharp image on the retina. The distance of the fixed object from the eyes at which vergence is directed is referred to as the vergence distance, and the distance from the eyes at which accommodation is adjusted is referred to as the accommodation distance. Vergence and accommodation are neurally coupled such that, during natural vision in the real world, the vergence distance and the accommodation distance are equal.

As shown in FIGS. 1A-1C, as the fixated object is placed at various distances from the eyes, the vergence distance and the accommodation distance are matched to that distance. As the object becomes closer in FIGS. 1B and 1C, the accommodation of the user's eye is adjusted by increasing the thickness of the lens (and accordingly its optical power). This causes the object to have a sharp projection on the retina, while other objects in the user's field of view at different distances from the user's eyes experience natural depth-of-field blur.

Figure 2:
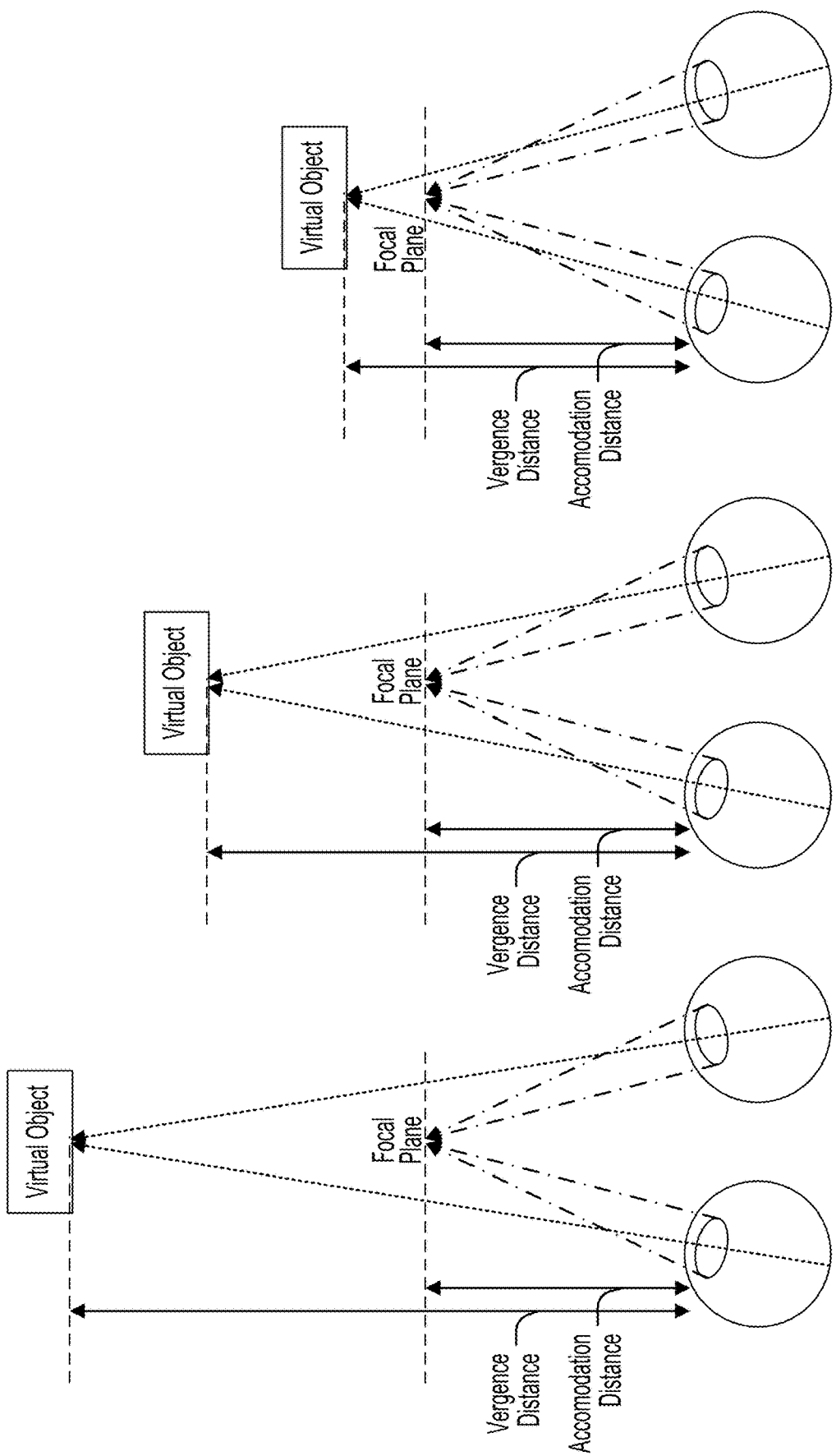
FIGS. 2A-2C illustrate examples of the vergence and accommodation of a user's eyes when using an AR/MR display utilizing a fixed focal plane.

FIGS. 2A-2C illustrate examples of the vergence and accommodation of a user's eyes when using an AR/MR display utilizing a fixed focal plane. When viewing a virtual object at the same set of distances as the real-world object shown in FIGS. 1A-1C, the virtual object appears to the user as being located at the correct set of distances, however the light associated with the virtual object comes from the fixed distance of the display, which causes the eye's lens to not change power. Thus, the vergence distance and the accommodation distance are generally not matched since the eye accommodates to the fixed distance of the display while converging to the distances of the virtual object. Additionally, other virtual objects in the user's field of view at different distances from the user's eyes may not experience natural depth-of-field blur and may instead appear sharp.

Figure 3:
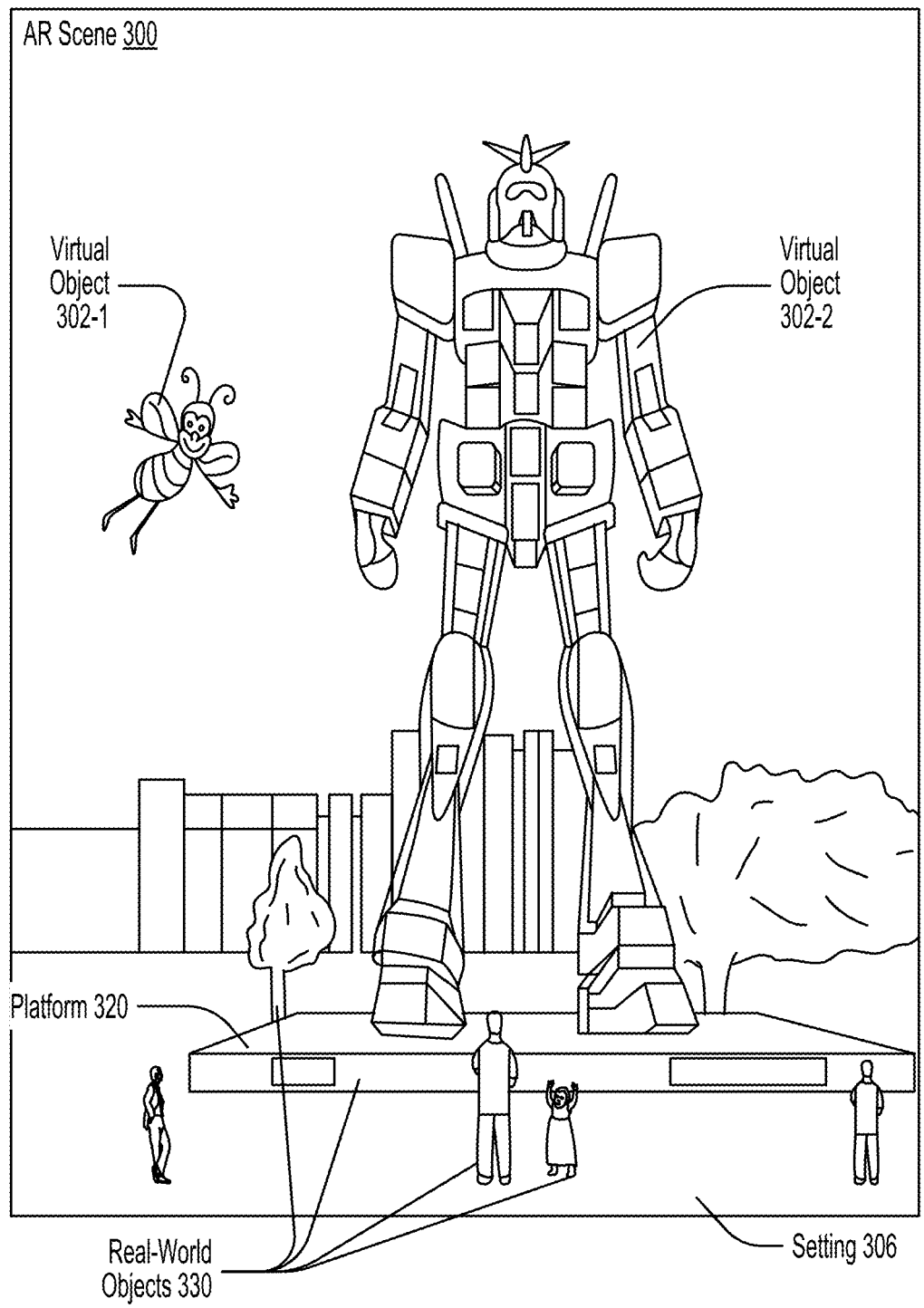
FIG. 3 illustrates an AR scene as viewed through a wearable AR device.

FIG. 3 illustrates an AR scene 300 as viewed through a wearable AR device, according to some embodiments of the present invention. AR scene 300 is depicted wherein a user of an AR technology sees a real-world park-like setting 306 featuring various real-world objects 330 such as people, trees, buildings in the background, and a real-world concrete platform 320. In addition to these items, the user of the AR technology also perceives that they "see" various virtual objects 302 such as a robot statue 302-2 standing upon the real-world concrete platform 320, and a cartoon-like avatar character 302-1 flying by, which seems to be a personification of a bumble bee, even though these elements (character 302-1 and statue 302-2) do not exist in the real world.

Figure 4A:
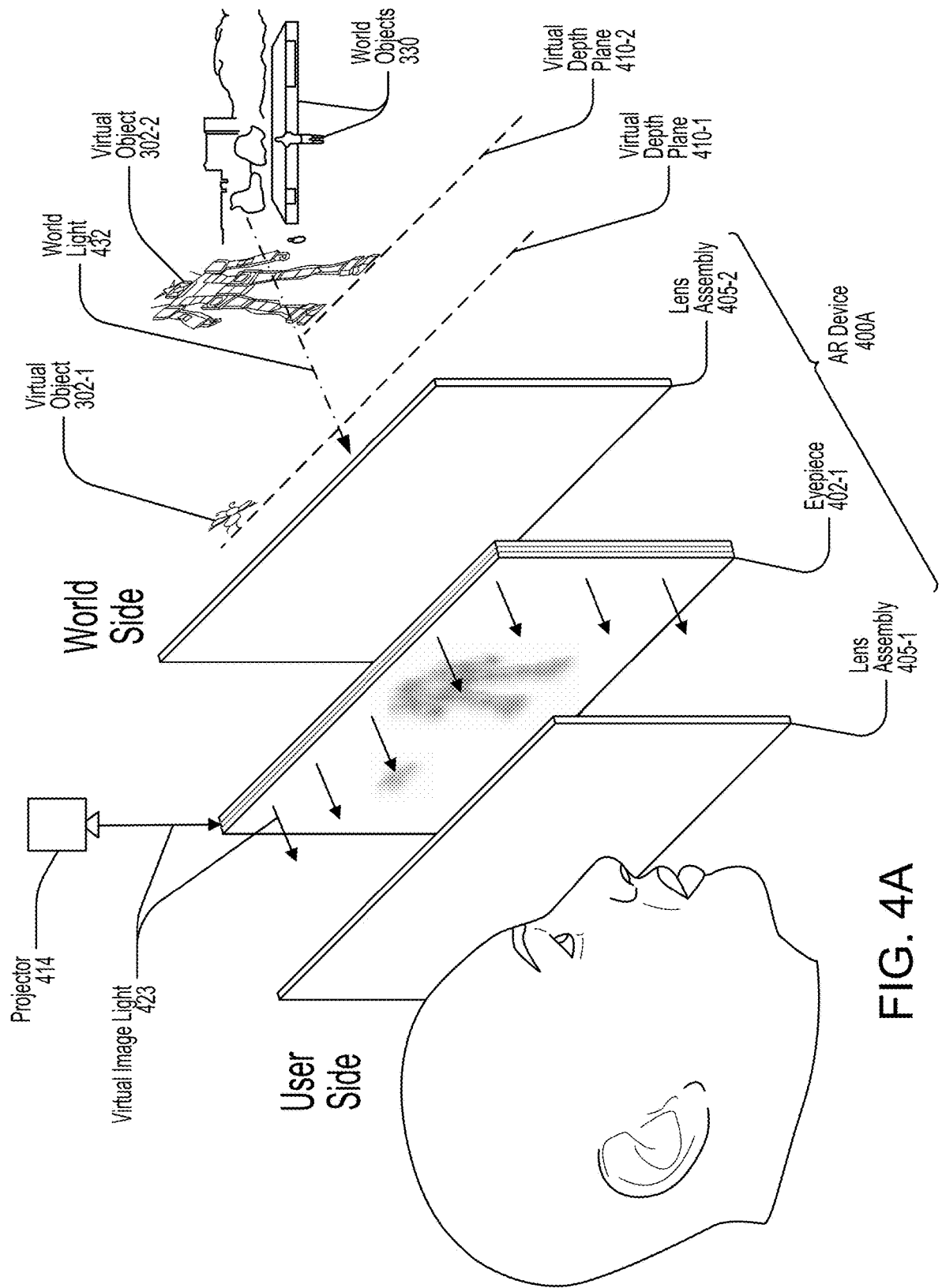
FIGS. 4A and 4B illustrate AR devices having a single fixed focal plane and two fixed focal planes, respectively.

FIG. 4A illustrates an AR device 400A having a single fixed focal plane, according to some embodiments of the present invention. During operation, a projector 414 of AR device 400A may project virtual image light 423 (i.e., light associated with virtual content) onto an eyepiece 402-1, which may cause a light field (i.e., an angular representation of virtual content) to be projected onto a retina of a user in a manner such that the user perceives the corresponding virtual content as being positioned at some location within an environment of the user. For example, virtual image light 423 outcoupled by eyepiece 402-1 may cause the user to perceive character 302-1 as being positioned at a first virtual depth plane 410-1 and statue 302-2 as being positioned at a second virtual depth plane 410-2. The user perceives the virtual content along with world light 432 corresponding to one or more world objects 430, such as platform 320.

In some embodiments, AR device 400A includes a first lens assembly 405-1 positioned on the user side of eyepiece 402-1 (the side of eyepiece 402-1 closest to the eye of the user) and a second lens assembly 405-2 positioned on the world side of eyepiece 402-1. Each of lens assemblies 405-1, 405-2 may be configured to apply optical power to the light passing therethrough.

Figure 4B:
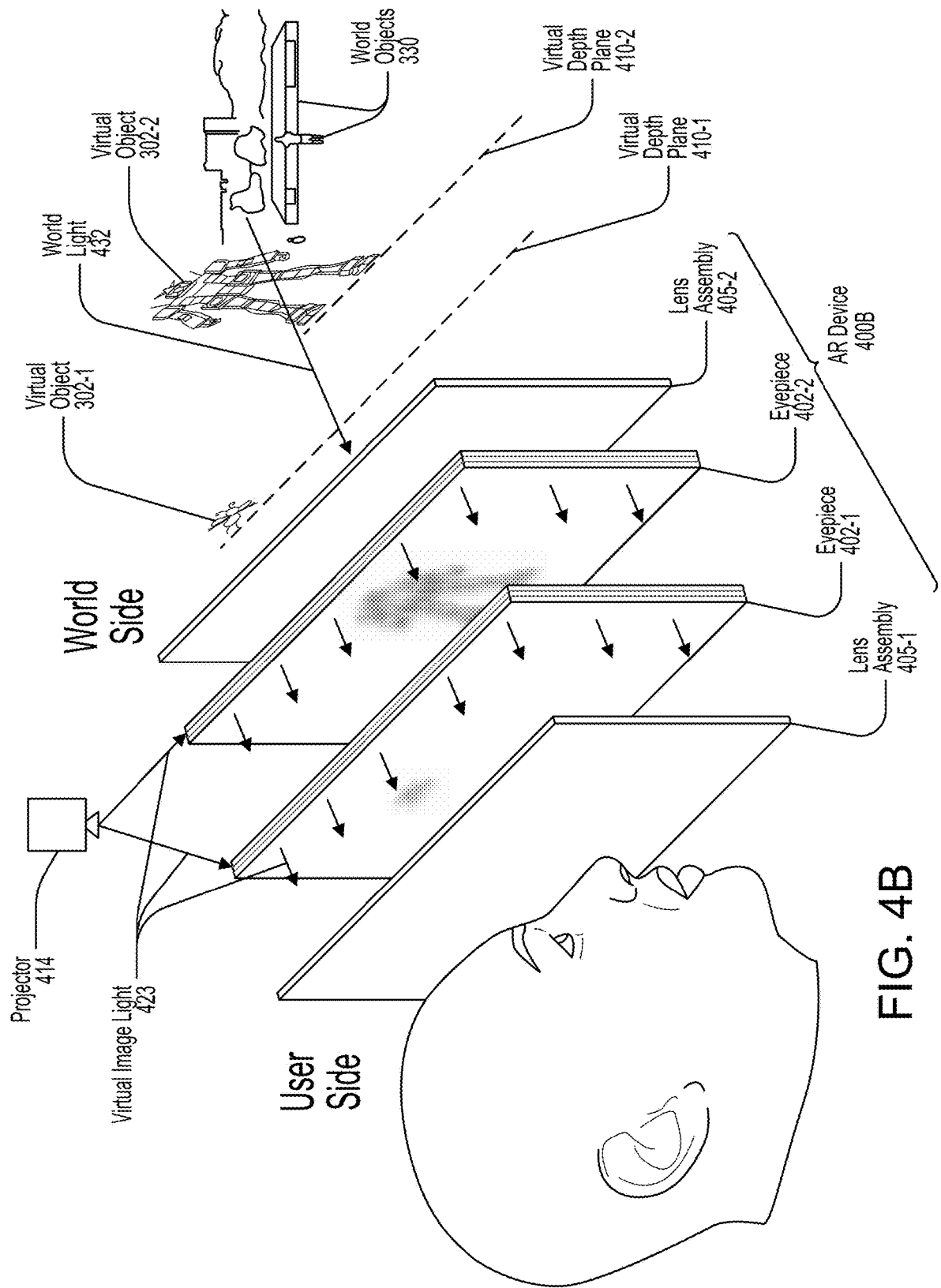

FIG. 4B illustrates an AR device 400B having two fixed focal planes, according to some embodiments of the present invention. During operation, projector 414 may project virtual image light 423 onto first eyepiece 402-1 and a second eyepiece 402-2, which may cause a light field to be projected onto a retina of a user in a manner such that the user perceives the corresponding virtual content as being positioned at some location within an environment of the user. For example, virtual image light 423 outcoupled by first eyepiece 402-1 may cause the user to perceive character 102-1 as being positioned at a first virtual depth plane 410-1 and virtual image light 423 outcoupled by second eyepiece 402-2 may cause the user to perceive statue 102-2 as being positioned at a second virtual depth plane 410-2.

Figure 5:
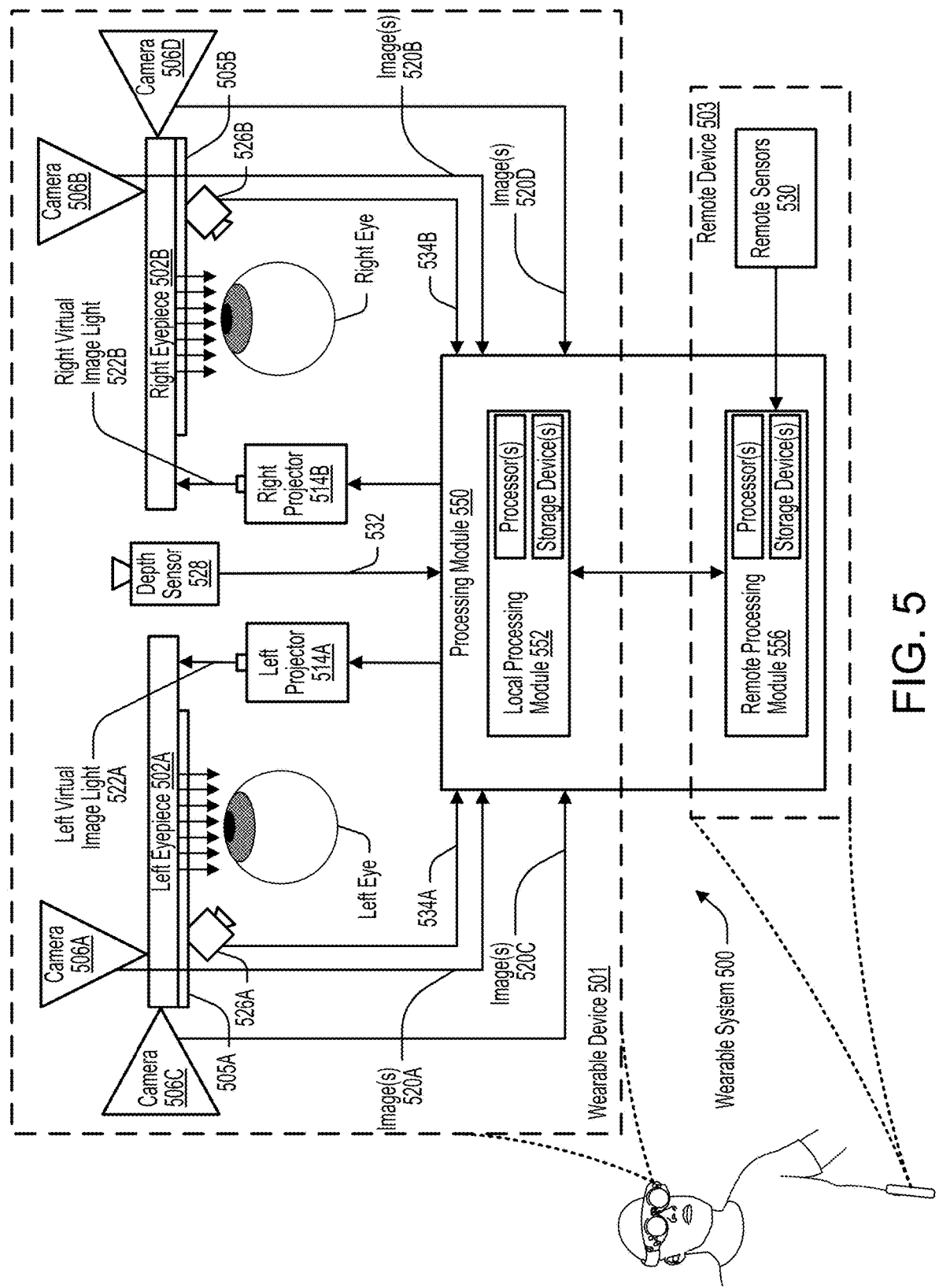
FIG. 5 illustrates a schematic view of an example wearable system.

FIG. 5 illustrates a schematic view of an example wearable system 500, according to some embodiments of the present invention. Wearable system 500 may include a wearable device 501 and at least one remote device 503 that is remote from wearable device 501 (e.g., separate hardware but communicatively coupled). Wearable device 501 as described in reference to FIG. 5 may correspond to AR devices 400 as described above in reference to FIGS. 4A and 4B. While wearable device 501 is worn by a user (generally as a headset), remote device 503 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 501 may include a left eyepiece 502A and a left lens assembly 505A arranged in a side-by-side configuration and constituting a left optical stack. Left lens assembly 505A may include an accommodating lens on the user side of the left optical stack as well as a compensating lens on the world side of the left optical stack. Similarly, wearable device 501 may include a right eyepiece 502B and a right lens assembly 505B arranged in a side-by-side configuration and constituting a right optical stack. Right lens assembly 505B may include an accommodating lens on the user side of the right optical stack as well as a compensating lens on the world side of the right optical stack.

In some embodiments, wearable device 501 includes one or more sensors including, but not limited to: a left front-facing world camera 506A attached directly to or near left eyepiece 502A, a right front-facing world camera 506B attached directly to or near right eyepiece 502B, a left side-facing world camera 506C attached directly to or near left eyepiece 502A, a right side-facing world camera 506D attached directly to or near right eyepiece 502B, a left eye tracking camera 526A directed toward the left eye, a right eye tracking camera 526B directed toward the right eye, and a depth sensor 528 attached between eyepieces 502. Wearable device 501 may include one or more image projection devices such as a left projector 514A optically linked to left eyepiece 502A and a right projector 514B optically linked to right eyepiece 502B.

Wearable system 500 may include a processing module 550 for collecting, processing, and/or controlling data within the system. Components of processing module 550 may be distributed between wearable device 501 and remote device 503. For example, processing module 550 may include a local processing module 552 on the wearable portion of wearable system 500 and a remote processing module 556 physically separate from and communicatively linked to local processing module 552. Each of local processing module 552 and remote processing module 556 may include one or more processing units (e.g., central processing units (CPUs), graphics processing units (GPUs), etc.) and one or more storage devices, such as non-volatile memory (e.g., flash memory).

Processing module 550 may collect the data captured by various sensors of wearable system 500, such as cameras 506, eye tracking cameras 526, depth sensor 528, remote sensors 530, ambient light sensors, microphones, inertial measurement units (IMUs), accelerometers, compasses, Global Navigation Satellite System (GNSS) units, radio devices, and/or gyroscopes. For example, processing module 550 may receive image(s) 520 from cameras 506. Specifically, processing module 550 may receive left front image(s) 520A from left front-facing world camera 506A, right front image(s) 520B from right front-facing world camera 506B, left side image(s) 520C from left side-facing world camera 506C, and right side image(s) 520D from right side-facing world camera 506D. In some embodiments, image(s) 520 may include a single image, a pair of images, a video comprising a stream of images, a video comprising a stream of paired images, and the like. Image(s) 520 may be periodically generated and sent to processing module 550 while wearable system 500 is powered on, or may be generated in response to an instruction sent by processing module 550 to one or more of the cameras.

Cameras 506 may be configured in various positions and orientations along the outer surface of wearable device 501 so as to capture images of the user's surrounding. In some instances, cameras 506A, 506B may be positioned to capture images that substantially overlap with the FOVs of a user's left and right eyes, respectively. Accordingly, placement of cameras 506 may be near a user's eyes but not so near as to obscure the user's FOV. Alternatively or additionally, cameras 506A, 506B may be positioned so as to align with the incoupling locations of virtual image light 522A, 522B, respectively. Cameras 506C, 506D may be positioned to capture images to the side of a user, e.g., in a user's peripheral vision or outside the user's peripheral vision. Image(s) 520C, 520D captured using cameras 506C, 506D need not necessarily overlap with image(s) 520A, 520B captured using cameras 506A, 506B.

In some embodiments, processing module 550 may receive ambient light information from an ambient light sensor. The ambient light information may indicate a brightness value or a range of spatially-resolved brightness values. Depth sensor 528 may capture a depth image 532 in a front-facing direction of wearable device 501. Each value of depth image 532 may correspond to a distance between depth sensor 528 and the nearest detected object in a particular direction. As another example, processing module 550 may receive eye tracking data 534 from eye tracking cameras 526, which may include images of the left and right eyes. As another example, processing module 550 may receive projected image brightness values from one or both of projectors 514. Remote sensors 530 located within remote device 503 may include any of the above-described sensors with similar functionality.

Virtual content is delivered to the user of wearable system 500 using projectors 514 and eyepieces 502, along with other components in the optical stacks. For instance, eyepieces 502A, 502B may comprise transparent or semi-transparent waveguides configured to direct and outcouple light generated by projectors 514A, 514B, respectively. Specifically, processing module 550 may cause left projector 514A to output left virtual image light 522A onto left eyepiece 502A, and may cause right projector 514B to output right virtual image light 522B onto right eyepiece 502B. In some embodiments, projectors 514 may include micro-electromechanical system (MEMS) spatial light modulator (SLM) scanning devices. In some embodiments, each of eyepieces 502A, 502B may comprise a plurality of waveguides corresponding to different colors. In some embodiments, lens assemblies 505A, 505B may be coupled to and/or integrated with eyepieces 502A, 502B. For example, lens assemblies 505A, 505B may be incorporated into a multi-layer eyepiece and may form one or more layers that make up one of eyepieces 502A, 502B.

Figure 6:
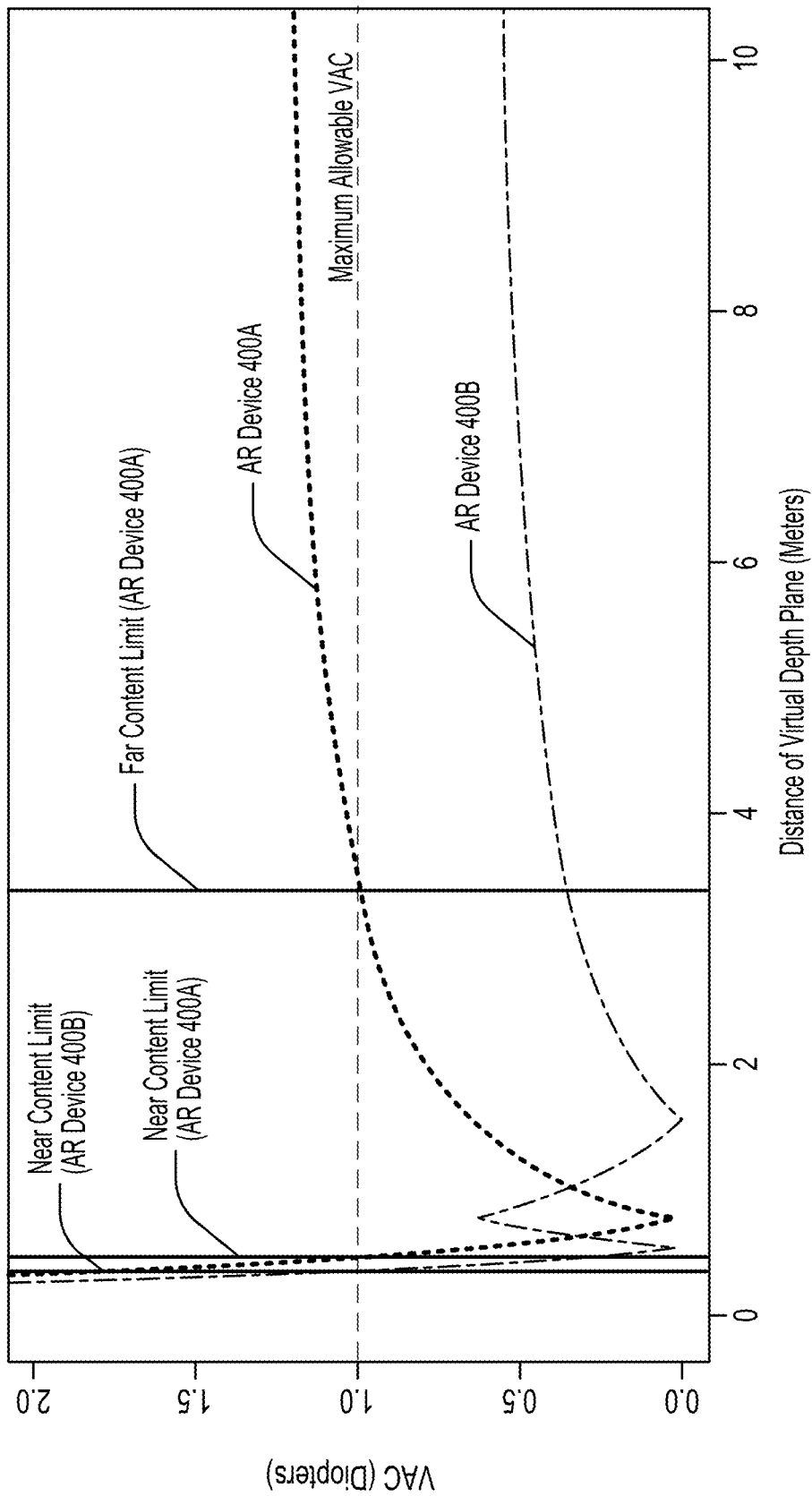
FIG. 6 illustrates the relationship between VAC and the distance of the virtual depth plane.

FIG. 6 illustrates the relationship between VAC and the distance of the virtual depth plane for each of AR devices 400A, 400B described in reference to FIGS. 4A and 4B, respectively. For AR device 400B, the two-focal plane system provides switchable focal planes at 1.95 diopters (0.51 meters) and 0.65 diopters (1.54 meters), with a switch point at 1.3 diopters (0.77 meters), a near content limit (clipping plane) at 2.7 diopters (0.37 meters), and an ability to provide imagery never exceeding 1.0 diopter VAC between that plane and infinity. For AR device 400A, the single fixed focal plane system has a focal plane location at 1.5 diopters (0.6 meters) and a near content limit of 2.5 diopters (0.4 meters) and a far content limit of 0.31 diopters (3.2 meters), assuming a maximum allowable VAC of 1.0 diopter. Such a configuration would have a usable range of 0.4-3.2 meters with content falling outside of that range requiring some solution to mitigate exceeding the VAC limit.

Figure 7A:
FIGS. 7A and 7B illustrate graphics of the perceived sharpness of virtual content under different conditions.
Figure 7B:

FIGS. 7A and 7B illustrate graphics of the perceived sharpness of virtual content under different conditions. FIG. 7A illustrates the perceived sharpness degradation of virtual content (left side graphic) or of real-world objects (right side graphic) for a single focal plane solution where there is a large amount of VAC present. FIG. 7B illustrates the perceived sharpness of both the virtual content and the real-world objects when monovision is employed by the wearable system.

Figure 8:
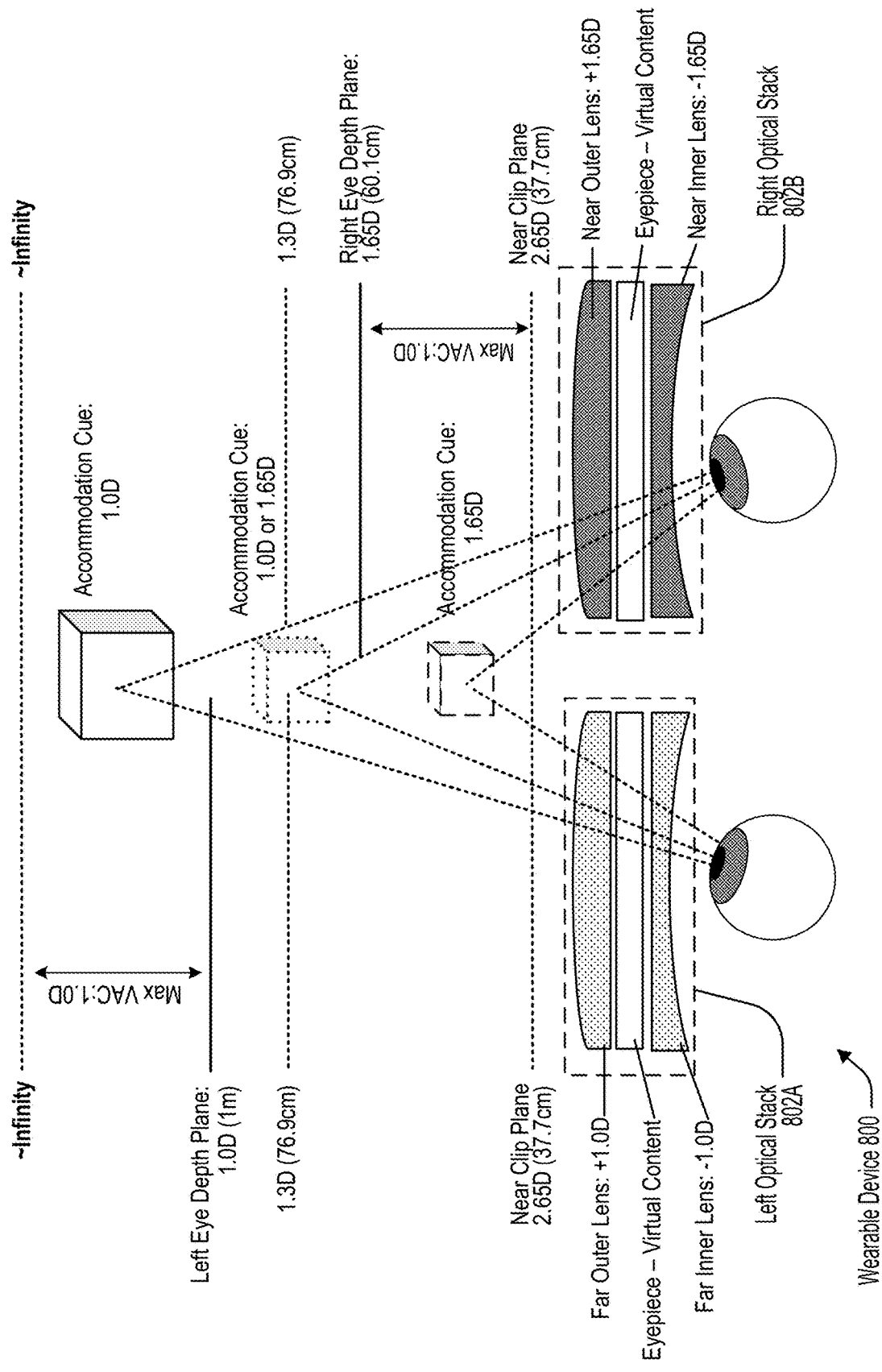
FIG. 8 illustrates a wearable device utilizing a monovision solution.

FIG. 8 illustrates a wearable device 800 utilizing a monovision solution, according to some embodiments of the present invention. Wearable device 800 includes a set of inner refractive lenses that provide the desired optical power of the virtual content to the user's eyes. Wearable device 800 may be calibrated such that all distortions and associated magnifications are not distinguishable between the left and right virtual images, and the only distinguishing artifact between the left and right virtual images may be the associated depth/accommodation plane. Wearable device 800 also includes a set of outer refractive lenses to compensate for the distortion and the magnification of the real-world for each eye.

Specifically, wearable device 800 includes a left optical stack 802A and a right optical stack 802B, each of which includes an inner lens, an eyepiece, and an outer lens. Each of the eyepieces may receive virtual image light from a projector of wearable device 800 and may output the virtual image light toward one of the user's eyes. Each of the inner lenses, which may also be referred to as an accommodating lens and/or a diverging lens, may impart negative optical power to light passing therethrough, which may include virtual image light and/or world light. Each of the outer lenses, which may also be referred to as a compensating lens and/or a converging lens, may impart positive optical power to light passing therethrough, which may only include world light.

Accommodation of the eyes is driven by accommodation demand of the eye that is best corrected for viewing the vergence distance. This concept drives the user to accommodate to whichever eye has a sharper image and less VAC. This inherently lowers the VAC and therefore improves the visual comfort over the target operating range. If the desired operating range of virtual content is defined to be from 2.65 to 0 diopters (37 cm to infinity) and the tolerable VAC is defined to be <1.0 diopters, this would place a nominal depth plane at ~1.3 diopters with +/−0.3 diopters of optical power disparity between left and right eyes. The difference between the optical powers of the left inner lens and the right inner lens may be referred to as the offset amount, which is equal to 0.65 diopters in the illustrated example.

Figure 9B:
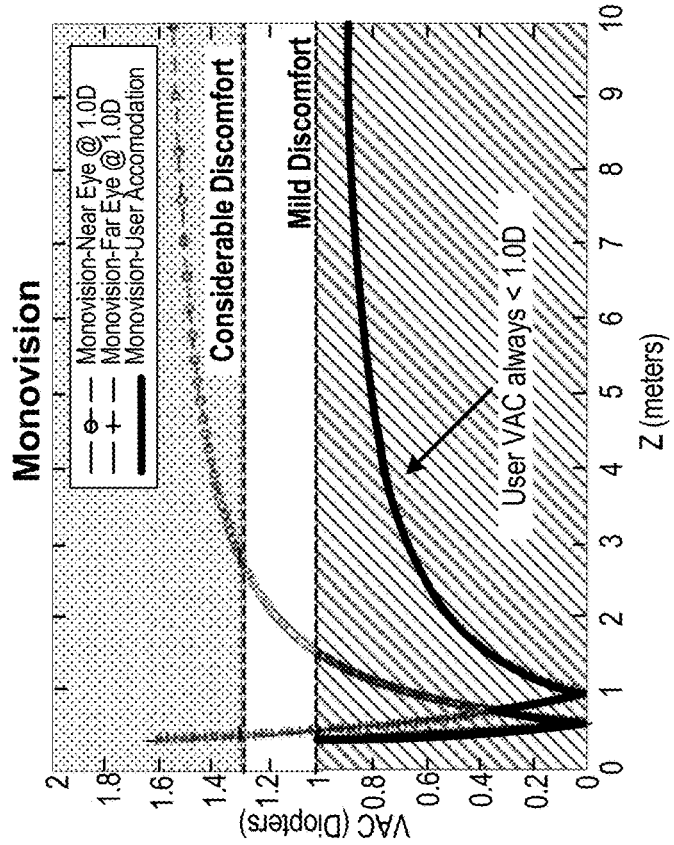
FIGS. 9A and 9B illustrate graphs showing VAC versus content position measured from the user eye plane.
Figure 9A:
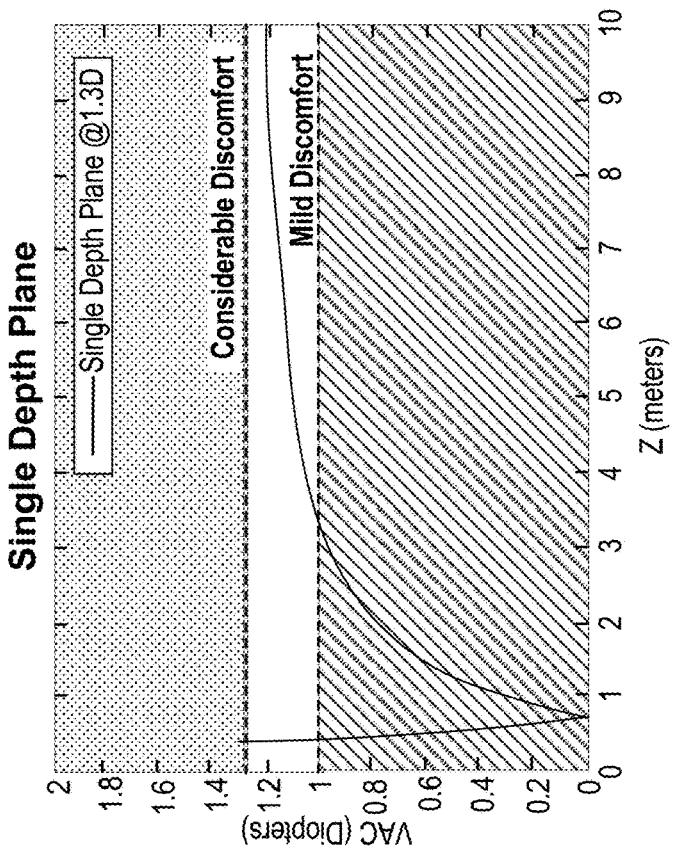

FIGS. 9A and 9B illustrate graphs showing VAC versus content position measured from the user eye plane, according to some embodiments of the present invention. FIG. 9A illustrates a single depth plane solution centered at 1.3 diopters and FIG. 9B illustrates an equivalent solution using wearable device 800. As shown, the VAC experienced by a user is equal to the minimum VAC between the two focal planes. For example, the VAC experienced by the user for distances closer than ~0.8 meters is equal to the VAC for the near focal plane and for distances further than ~0.8 meters is equal to the VAC for the far focal plane. The +/−0.3 diopters anisometropia in this example (or 0.6 diopter offset amount) can be replaced by any other amount of anisometropia to achieve different levels of VAC.

Figure 10:
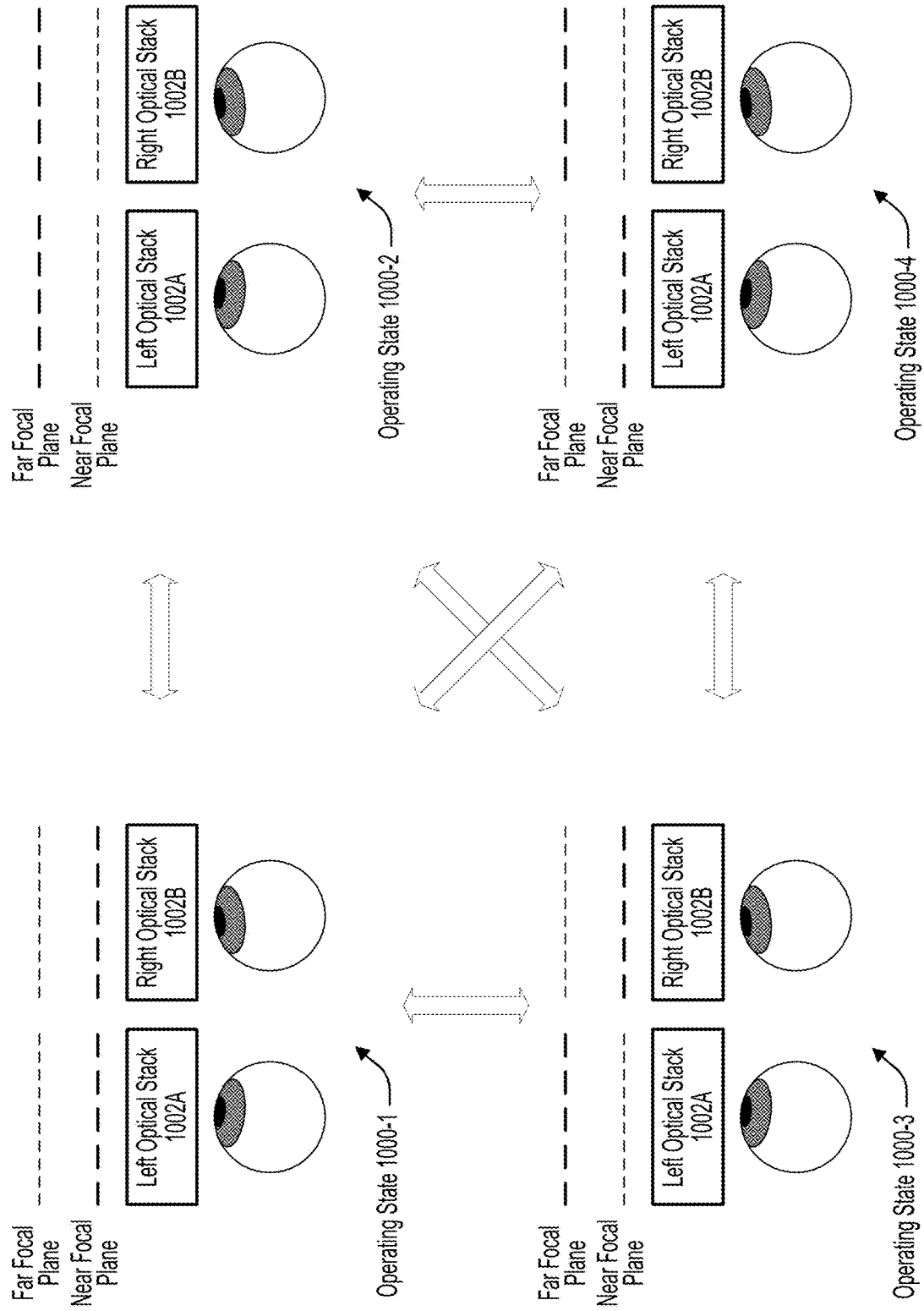
FIG. 10 illustrates different operating states of a wearable device.

FIG. 10 illustrates examples of different operating states of a wearable device, according to some embodiments of the present invention. The wearable device includes left and right optical stacks 1002, each with the ability to switch between displaying virtual content at a near focal plane and a far focal plane. In accordance with a first operating state 1000-1, each of optical stacks 1002 is caused to display virtual content at the near focal plane. In accordance with a second operating state 1000-2, each of optical stacks 1002 is caused to display virtual content at the far focal plane. In accordance with a third operating state 1000-3, left optical stack 1002A is caused to display virtual content at the far focal plane and right optical stack 1002B is caused to display virtual content at the near focal plane. In accordance with a fourth operating state 1000-4, left optical stack 1002A is caused to display virtual content at the near focal plane and right optical stack 1002B is caused to display virtual content at the far focal plane.

The wearable device may switch between different operating states 1000 based on various factors. For example, eye tracking data captured by eye tracking cameras may be analyzed to determine that a user is fixated at the near focal plane or the far focal plane, and accordingly the wearable device may switch to operating state 1000-1 or operating state 1000-2, respectively. In some examples, the virtual content to be displayed may be analyzed to determine that the virtual content is represented at only the near focal plane or the far focal plane, and accordingly the wearable device may switch to operating state 1000-1 or operating state 1000-2, respectively.

In some examples, it may be determined that an activation condition associated with a monovision display mode is satisfied, and accordingly the wearable device may activate the monovision display mode by switching to either operating state 1000-3 or operating state 1000-4. The activation condition may be that eye tracking data is unavailable (e.g., eye tracking camera is unable to capture image of eye), that a vergence distance cannot be determined based on the eye tracking data (e.g., eye tracking data is too unreliable or erratic), that the virtual content to be displayed is represented at both the near focal plane and the far focal plane, that a user has provided an input indicating user discomfort, that a user has provided an input indicating a preference for monovision, and any combination thereof.

After a predetermined amount of time from activation of the monovision display mode, the wearable device may reevaluate the activation condition to determine whether it remains satisfied. If the activation condition is no longer satisfied (e.g., eye tracking data becomes available, virtual content to be displayed is represented at a single focal plane, etc.) the wearable device may deactivate the monovision display mode by switching to either operating state 1000-1 or operating state 1000-2.

In some examples, after a predetermined amount of time from activation of the monovision display mode, the wearable device may switch from operating state 1000-3 to operating state 1000-4, or from operating state 1000-4 to operating state 1000-3. This can prevent the same anisometropia from being experienced by the user's eyes for a long period of time. By periodically switching the focal planes, this situation can be prevented from happening.

Figure 11:
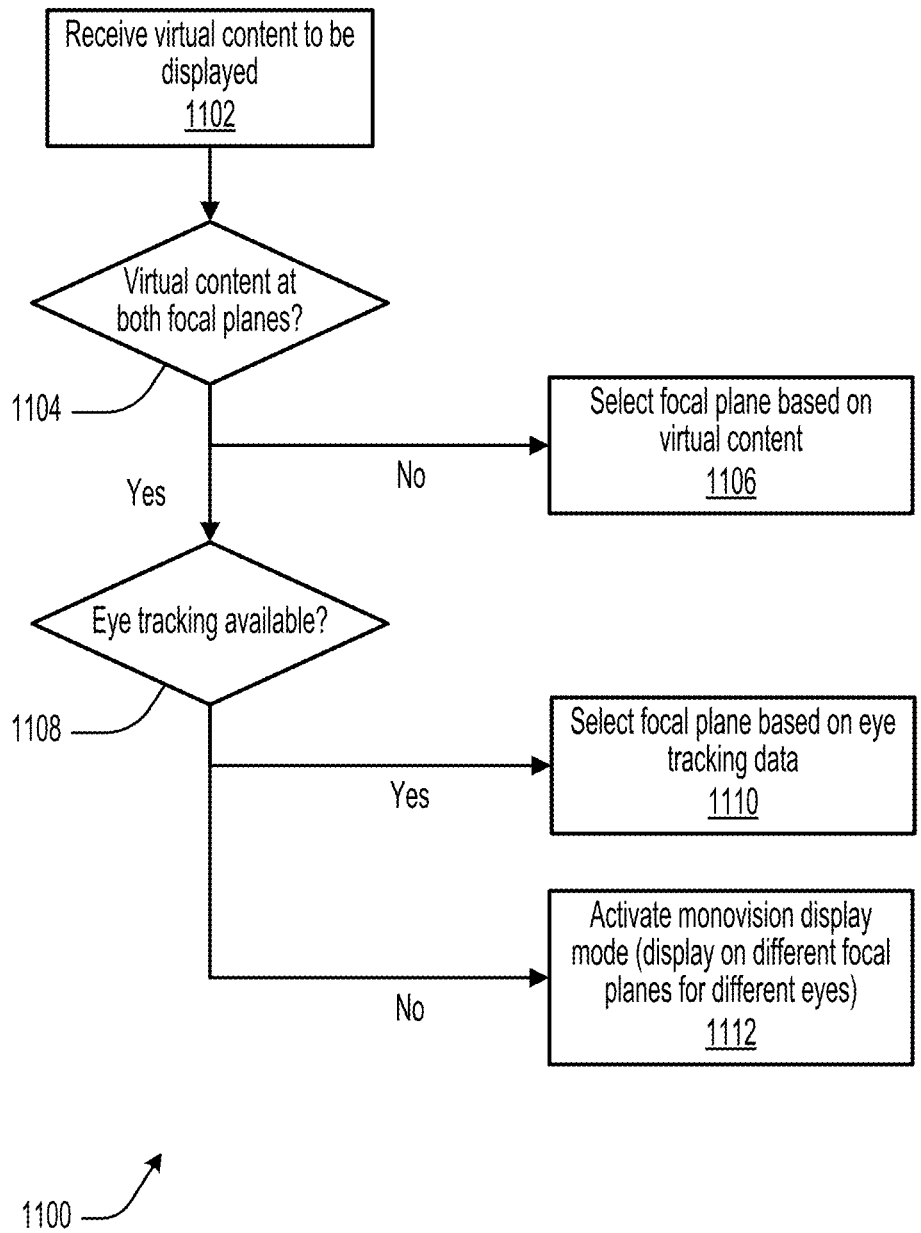
FIG. 11 illustrates a method of operating a wearable device.

FIG. 11 illustrates a method 1100 of operating a wearable device, according to some embodiments of the present invention. One or more steps of method 1100 may be omitted during performance of method 1100, and steps of method 1100 need not be performed in the order shown. One or more steps of method 1100 may be performed or facilitated by one or more processors, such as those included in processing module 550.

At step 1102, virtual content to be displayed at each of the optical stacks is received at the wearable device. At step 1104, it is determined whether or not the virtual content to be displayed is represented at both the first focal plane and the second focal plane. If it is, method 1100 proceeds to step 1108. If it is not, method 1100 proceeds to step 1106. At step 1106, the first focal plane or the second focal plane is selected for displaying the virtual content for both optical stacks based on which focal plane the virtual content is represented at. At step 1108, it is determined whether or not eye tracking data is available. If it is, method 1100 proceeds to step 1110. If it is not, method 1100 proceeds to step 1112.

At step 1110, the first focal plane or the second focal plane is selected for displaying the virtual content for both optical stacks based on which focal plane the user is fixated at. At step 1112, a monovision display mode is activated by the wearable device by causing the left optical stack to display the virtual content at the first focal plane and causing the right optical stack to display the virtual content at the second focal plane. The optical stacks may display the virtual content simultaneously at the different focal planes.

Figure 12:
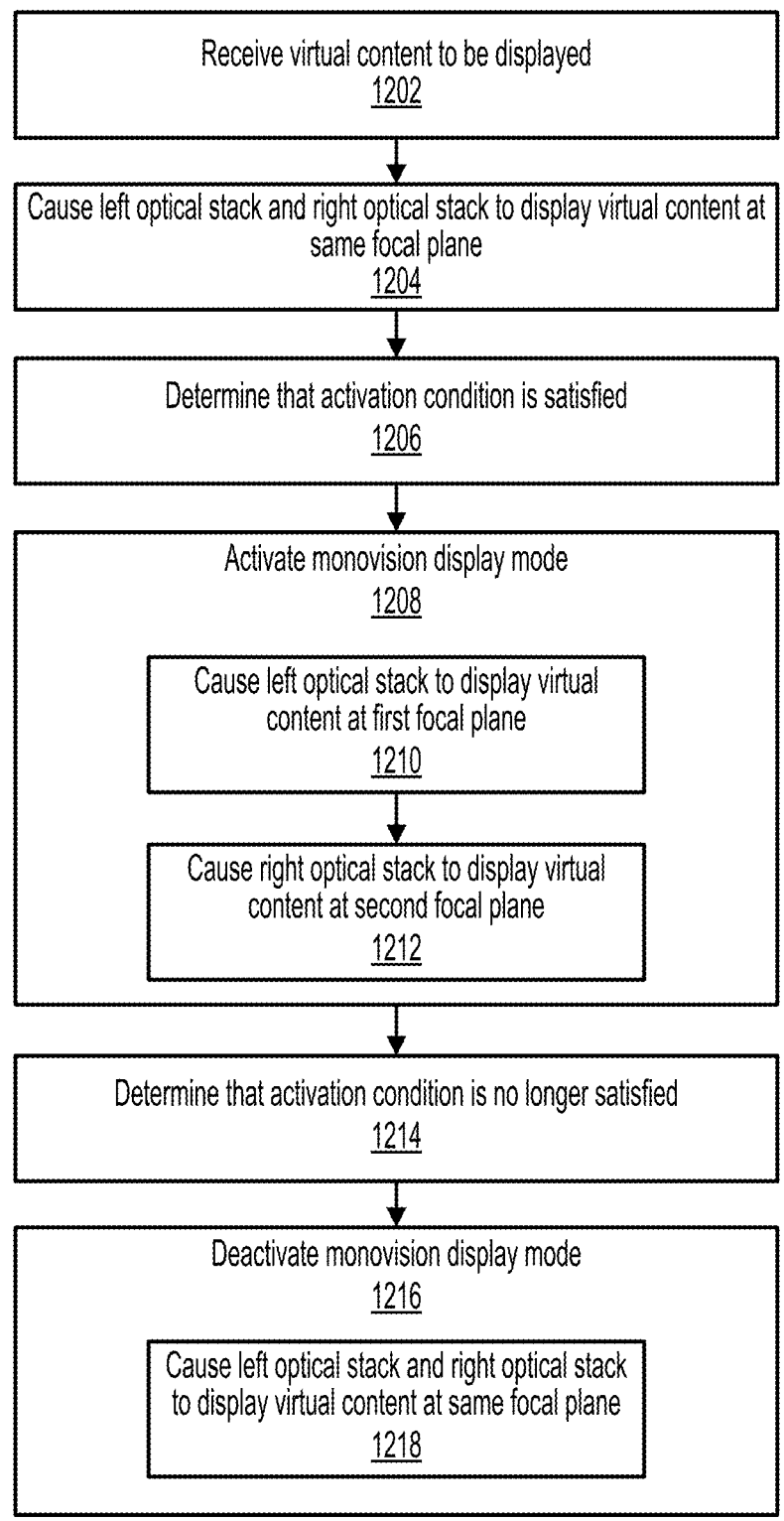
FIG. 12 illustrates a method of operating a wearable device.

FIG. 12 illustrates a method 1200 of operating a wearable device, according to some embodiments of the present invention. One or more steps of method 1200 may be omitted during performance of method 1200, and steps of method 1200 need not be performed in the order shown. One or more steps of method 1200 may be performed or facilitated by one or more processors, such as those included in processing module 550.

At step 1202, virtual content to be displayed at each of the optical stacks is received at the wearable device. For example, an application running on the wearable device may render a left frame and a right frame (or a series of left frames and right frames) to be displayed and may deliver the frame to a left projector and a right projector of the wearable device.

At step 1204, the left optical stack and the right optical stack are caused to display the virtual content at the same focal plane. For example, both optical stacks may display the virtual content at a first focal plane of the wearable device, or both optical stacks may display the virtual content at a second focal plane of the wearable device. In some examples, the first focal plane is the near focal plane and the second focal plane is the far focal plane. In some examples, the first focal plane is the far focal plane and the second focal plane is the near focal plane. The optical power associated with the first focal plane and the optical power associated with the second focal plane may differ by an offset amount.

At step 1206, it is determined that an activation condition is satisfied. The activation condition may be that eye tracking data is unavailable (e.g., eye tracking camera is unable to capture image of eye), that a vergence distance cannot be determined based on the eye tracking data (e.g., eye tracking data is too unreliable or erratic), that the virtual content to be displayed is represented at both the first focal plane and the second focal plane, that a user has provided an input indicating user discomfort, that a user has provided an input indicating a preference for monovision, and any combination thereof.

At step 1208, in response to determining that the activation condition is satisfied, a monovision display mode associated with the wearable device is activated. Activating the monovision display mode may include, at step 1210, causing the left optical stack to display the virtual content at the first focal plane and, at step 1212, causing the right optical stack to display the virtual content at the second focal plane.

At step 1214, it is determined that the activation condition is no longer satisfied. Determining that the activation condition is no longer satisfied may include determining that eye tracking data has become available, that the virtual content is represented at a single focal plane, that a user has provided an input indicating user comfort or has stopped providing an input indicating user discomfort, that a user has provided an input for deactivation of monovision, or any combination thereof.

At step 1216, in response to determining that the activation condition is no longer satisfied, the monovision display mode is deactivated. Deactivating the monovision display mode may include, at step 1218, causing the left optical stack and the right optical stack to display the virtual content at the same focal plane. For example, the optical stacks may both display the virtual content at the first focal plane or the second focal plane of the wearable device.

Figure 13:
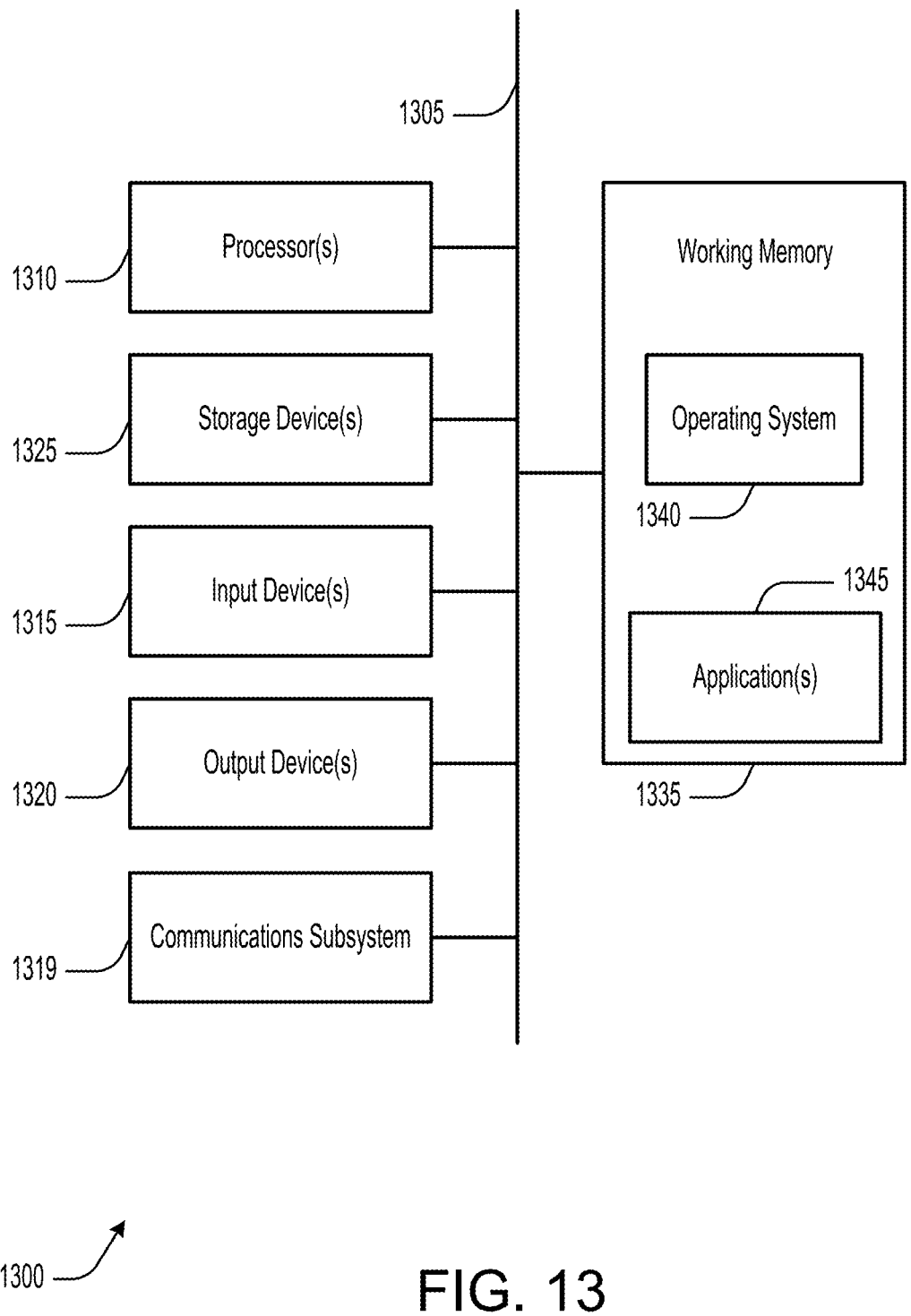
FIG. 13 illustrates a simplified computer system.

FIG. 13 illustrates a simplified computer system 1300 according to an embodiment described herein. Computer system 1300 as illustrated in FIG. 13 may be incorporated into devices described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1319. In other embodiments, a portable electronic device, e.g. the first electronic device, may be incorporated into computer system 1300, e.g., an electronic device as an input device 1315. In some embodiments, computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1319 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A monovision wearable device comprising:
  a left optical stack comprising:
    a left eyepiece configured to receive left virtual image light and output the left virtual image light toward a user side of the monovision wearable device;
    a left accommodating lens disposed between the left eyepiece and the user side of the monovision wearable device; and
    a left compensating lens disposed between the left eyepiece and a world side of the monovision wearable device; and
  a right optical stack comprising:
    a right eyepiece configured to receive right virtual image light and output the right virtual image light toward the user side of the monovision wearable device;
    a right accommodating lens disposed between the right eyepiece and the user side of the monovision wearable device; and
    a right compensating lens disposed between the right eyepiece and the world side of the monovision wearable device;
  wherein:
    an optical power of the left accommodating lens is equal in magnitude to an optical power of the left compensating lens;
    an optical power of the right accommodating lens is equal in magnitude to an optical power of the right compensating lens; and
    the optical power of the left accommodating lens and the optical power of the right accommodating lens differ by an offset amount simultaneously.

2. The monovision wearable device of claim 1 wherein the left accommodating lens is a diverging lens and the left compensating lens is a converging lens.

3. The monovision wearable device of claim 1 wherein the right accommodating lens is a diverging lens and the right compensating lens is a converging lens.

4. The monovision wearable device of claim 1 wherein:
  the left optical stack is configured to display the left virtual image light at a first focal plane; and
  the right optical stack is configured to simultaneously display the right virtual image light at a second focal plane different from the first focal plane.

5. The monovision wearable device of claim 4 wherein the first focal plane is different than the second focal plane.

6. The monovision wearable device of claim 5 wherein the first focal plane and the second focal plane differ by the offset amount.

7. The monovision wearable device of claim 1 wherein the offset amount is greater than a threshold.

8. The monovision wearable device of claim 7 wherein the threshold is between 0.1 D and 1.0 D.

9. The monovision wearable device of claim 8 wherein the threshold is one of 0.1 D, 0.2 D, 0.3 D, 0.4 D, 0.5 D, 0.6 D, 0.7 D, 0.8 D, 0.9 D, or 1.0 D.

10. The monovision wearable device of claim 1 wherein:
  the optical power of the left accommodating lens is −1.0 D;
  the optical power of the left compensating lens is +1.0 D;
  the optical power of the right accommodating lens is −1.65 D; and
  the optical power of the right compensating lens is +1.65 D.

11. The monovision wearable device of claim 1 further comprising:
  a left eye tracking camera disposed adjacent the left eyepiece; and
  a right eye tracking camera disposed adjacent the right eyepiece.

12. The monovision wearable device of claim 1 further comprising:
  a left front-facing world camera disposed adjacent the left eyepiece;
  a left side-facing world camera disposed adjacent the left eyepiece;
  a right front-facing world camera disposed adjacent the right eyepiece; and a right side-facing world camera disposed adjacent the right eyepiece.

13. The monovision wearable device of claim 12 wherein:
the left front-facing world camera is configured to capture left images that overlap with a left field of view of the left optical stack; and
the right front-facing world camera is configured to capture right images that overlap with a right field of view of the right optical stack.

14. The monovision wearable device of claim 12 wherein:
the left side-facing world camera is configured to capture left images that do not overlap with a left field of view of the left optical stack; and
the right side-facing world camera is configured to capture right images that do not overlap with a right field of view of the right optical stack.

15. The monovision wearable device of claim 1 further comprising a depth sensor disposed between the left eyepiece and the right eyepiece.

16. The monovision wearable device of claim 1 further comprising:
a left projector configured to project the left virtual image light; and
a right projector configured to project the right virtual image light.

17. The monovision wearable device of claim 1 further comprising a processing system comprising a local processing module and a remote processing module physically separate from and communicatively linked to the local processing module.

18. The monovision wearable device of claim 1 further comprising an ambient light sensor.

19. The monovision wearable device of claim 1 wherein:
the left eyepiece and the right eyepiece comprise semi-transparent waveguides.

* * * * *